United States Patent
Dawidowsky

(10) Patent No.: US 7,734,307 B2
(45) Date of Patent: Jun. 8, 2010

(54) METHOD FOR OPERATING A NEAR FIELD COMMUNICATION SYSTEM

(75) Inventor: Frank Dawidowsky, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 502 days.

(21) Appl. No.: 11/260,132

(22) Filed: Oct. 27, 2005

(65) Prior Publication Data
US 2006/0094356 A1     May 4, 2006

(30) Foreign Application Priority Data
Oct. 29, 2004   (EP)  ................................. 04025775

(51) Int. Cl.
*H04B 7/00*     (2006.01)
(52) U.S. Cl. ..................... 455/522; 455/41.1; 455/41.2; 455/13.4; 455/127.1; 370/314; 370/346
(58) Field of Classification Search ................. 455/522, 455/41.2, 13.4, 574, 127.1, 343.1, 343.2, 455/343.5; 370/314, 346, 437
See application file for complete search history.

(56) References Cited

U.S. PATENT DOCUMENTS

| | | | | |
|---|---|---|---|---|
| 3,968,435 | A | | 7/1976 | Stover |
| 5,832,390 | A | * | 11/1998 | Irvin ........................ 455/569.2 |
| 6,879,570 | B1 | * | 4/2005 | Choi ........................... 370/329 |
| 7,020,474 | B2 | * | 3/2006 | Scott ........................ 455/456.1 |
| 7,061,428 | B1 | * | 6/2006 | Amir et al. ................... 342/458 |
| 7,165,171 | B2 | * | 1/2007 | Zhang et al. .................... 713/1 |
| 7,194,261 | B2 | * | 3/2007 | Emeott et al. ............. 455/426.2 |
| 7,330,445 | B2 | * | 2/2008 | Park ........................... 370/314 |
| 2005/0043027 | A1 | * | 2/2005 | Emeott et al. ............. 455/435.1 |
| 2006/0205444 | A1 | * | 9/2006 | Aerrabotu et al. ........... 455/574 |
| 2007/0026825 | A1 | * | 2/2007 | Wilson ........................ 455/130 |
| 2008/0043661 | A1 | * | 2/2008 | Park ........................... 370/314 |

FOREIGN PATENT DOCUMENTS

| | | |
|---|---|---|
| EP | 0 600 695 | 6/1994 |
| GB | 2 279 536 | 1/1995 |
| WO | WO 2004/056005 | 7/2004 |

OTHER PUBLICATIONS

The Chinese Office Action dated Aug. 12, 2009.*

* cited by examiner

*Primary Examiner*—Minh D Dao
(74) *Attorney, Agent, or Firm*—Oblon, Spivak, McClelland, Maier & Neustadt, L.L.P.

(57) ABSTRACT

A method for operating a near field communication system, including a plurality of participating near field communication devices, the method comprising repeatedly changing, for each of the plurality of participating near field communication devices, an operational mode of the respective participating near field communication device between a target operational mode and an initiator operational mode until communication is established between the respective participating near field communication device and another one of the plurality of participating near field communication devices, or until an interruption condition is fulfilled.

13 Claims, 4 Drawing Sheets

METHOD FOR OPERATING A NEAR FIELD COMMUNICATION SYSTEM

BACKGROUND OF THE INVENTION

1. Field of the Invention

The present invention relates to a method for operating a near field communication system. The present invention in particular relates to a method to increase the probability of best fitting NFC device type selection during NFC initial start up phase in order to save power.

2. Description of Related Art

Nowadays, near field communication becomes more and more important. Examples for near field communication systems or NFC systems are for instance based on the interaction between an intelligent device which in many cases is a so-called intelligent card reader, a card which is capable of carrying and transmitting information from a storage means to the intelligent device or card reader. The interaction between the card reader and the card is for example realized by radiation or radiation connection, for instance by using so-called contactless chip cards. An intelligent device is referred to be a device which has a certain degree of processing and/or calculation power in order to comply with higher services.

A basic aspect of a near field communication is the usage of electromagnetic waves in radio frequency range and that the transmission of the information content is realized over a short distance only, for instance in the range of several centimeters only.

This principle of short range information exchange by exchanging electromagnetic waves in the radio frequency range might be used in order to establish a communication between two intelligent devices for short range communication. However, no general concept is known how to establish the respective communication in an easy and reliable manner and further without the burden of user interaction. It is a particular problem that establishing a communication connection without user guidance might be difficult as participating near field communication devices are with reasonable probability in a same operational state, so that a communication can hardly be established.

BRIEF SUMMARY OF THE INVENTION

It is therefore an object underlying the present invention to provide a method for operating a near field communication system in a particular reliable and easy way without the necessity of user interaction.

The object is achieved by a method for operating a near field communication system according to independent claim 1. Preferred embodiments of the inventive method for operating a near field communication system are within the scope of the dependent sub-claims. The object is further achieved by a system or apparatus according to independent claim 12, by a near field communication device according to independent claim 13, by a computer program product according to independent claim 14, and by a computer readable storage medium according to independent claim 15.

The inventive method for operating a near field communication system is e.g. adapted for a near field communication system of at least a first and a second participating near field communication device. According to the present invention for each participating near field communication device an idle process is performed by repeatedly changing the respective participating near field communication devices operational state or mode between a target operational state or mode and an initiator operational state or mode until communication is established between said respective participating near field communication device and another participating near field communication device or until an interruption condition is fulfilled.

It is therefore a basic idea underlying the present invention to repeatedly switch the operational state or mode of participating near field communication devices between an initiator operational state or mode and a target operational state or mode. Thereby circumstances are forced in which with an increased probability at least one participating near field communication device is in a target operational mode and at least another one participating near field communication device is in an initiator operational state or mode. Thereby, situations are avoided in which no communication can be established as both participating near field communication devices are in a same operational mode or state.

In the sense of the invention a target operational state is an operational state of a participating near field communication device during an established communication process in which said participating near field communication device acts as a target or target device, i.e. it receives an RF signal from another participating near field communication device. In the sense of the invention a target operational mode is an operational mode of a participating near field communication device in which said participating near field communication device acts at least like a target or target device, i.e. it is at least listening and/or searching for an RF signal from another participating near field communication device, but without the necessity of an established communication process.

In the sense of the invention an initiator operational state is an operational state of a participating near field communication device during an established communication process in which said participating near field communication device acts as an initiator or initiator device, i.e. it sends out an RF signal to another connected participating near field communication device. In the sense of the invention a initiator operational mode is an operational mode of a participating near field communication device in which said participating near field communication device acts at least like an initiator or initiator device, i.e. it is at least sending out an initial RF polling signal, but without the necessity of the presence of or a connection to another participating near field communication device and therefore without the necessity of an established communication process.

According to a preferred embodiment of the inventive method for operating a near field communication system said method may additionally or alternatively comprise an initialization section for each of said participating near field communication devices in order to try to establish and to setup a connection and a communication between a respective participating near field communication device and another one of said participating near field communication device wherein said idle process is for each respective participating near field communication device a part of the respective initialization section.

According to a further preferred embodiment of the inventive method for operating a near field communication system periods of time for operating a respective participating near field communication device in the idle process in the target operational state or mode and in the initiator operating state or mode, respectively, are additionally or alternatively one of predetermined and generated during operation for each of said participating near field communication devices.

Said periods of time for operating a respective participating near field communication device in the idle process in the target operational state or mode and in the initiator operating state or mode may additionally or alternatively be different for different participating near field communication devices.

Said periods of time for operating a respective participating near field communication device in the idle process in the target operational state or mode and in the initiator operating state or mode may additionally or alternatively be different for a given participating near field communication device.

Preferably, the time periods for operating a given participating near field communication device in said initiator operational state or mode may be shorter than the time period for operating said respective participating near field communication device in said target operational state or mode, in particular in order to save energy.

Additionally or alternatively, the time period for operating a given participating near field communication device in said initiator operational state or mode may be a randomized value, in particular with a fixed component and a random component.

Further additionally or alternatively, the time period for operating a given participating near field communication device in said target operational state or mode is a randomized value, in particular with a fixed component and a random component.

According to a further preferred embodiment of the inventive method for operating a near field communication system for each participating near field communication device the respective idle process may additionally or alternatively be started with operating the respective participating near field communication device in said initiator operational state or mode.

On the other hand, according to a further preferred embodiment of the inventive method for operating a near field communication system for each participating near field communication device the respective idle process may additionally or alternatively be started with operating the respective participating near field communication device in said target operational state or mode.

According to a further preferred embodiment of the inventive method for operating a near field communication system for each of said participating near field communication devices the idle process for a respective participating near field communication device may additionally or alternatively be started with a randomly chosen operational state or mode which is chosen from the group consisting of the initiator operational state or mode and the target operational state or mode.

It is also an aspect of the present invention to provide a near field communication system or apparatus itself. The provided system or apparatus are according to the present invention arranged and/or capable of realizing the inventive method or to participate in or to be operated by the inventive method. The system and the apparatus therefore may have respective means in order to realize the inventive method or to be operated by the inventive method.

It is a further aspect of the present invention to provide a near field communication device which is arranged and/or adapted and which comprises means to realize the inventive method for operating a near field communication system or to participate or to be used in a respective near field communication system. Such a device may therefore be capable of being set-up as a target device or as an initiator device.

According to a further aspect of the present invention, a computer program product is provided, which comprises computer program means which is arranged and/or adapted in order to realize the inventive method for operating a near field communication system and its steps when it is executed on a computer or a digital signal processing means.

Finally, according to the present invention a computer-readable storage medium is provided which comprises the inventive computer program product.

These and further aspects of the present invention will be further discussed in the following:

The present invention in particular relates to method to increase the probability of best fitting NFC device type selection during NFC initial start up phase in order to save power.

Introduction

Common NFC device start up is currently defined in a way that all devices are per default NFC target devices, and that only if required by the application, a device can switch to NFC initiator device. There are scenarios where such a system is not feasible.

If two peer devices want to communicate without the need of any user interaction, the NFC device has to be continuously active. If two such devices try to communicate, no connection can be established, because both devices are emitting a RF field, and therefore both devices try to be NFC initiator. The result is that no communication can be established.

The solution described in this invention is, to implement a mechanism by which the NFC device is switched on and switched off in short intervals.

In order to preserve power the timing of the switch-on and switch-off phase is used to influence the probability of the device type selection to achieve that the mains-powered device have the burden of providing the RF field in most cases.

Near Field Technology products like RFID, FeliCa (Sony) and Mifare (Philips) are widely deployed. The systems are based on a reader/card architecture, which means that one device is a powerful reader and processing device and the second device is a simple storage card or tag. The NFCIP specification defined by ECMA also describes a "Active Communication Mode". Where two reader devices can communicate directly with each other using NFC technology. Also a "Passive Communication Code" is defined, mainly targeting the smart-card applications, but also usable for device to device communications, where the target device does not need any power. The target uses the RF field provided by the initiator device for communication. The initial RF collision avoidance and start up phase is defining that all devices are NFC target devices by default, and that NFC devices shall switch to NFC initiator devices if required by the application.

Problem

The current specification (NFCIP-1: ECMA-340) defines that all NFC devices have to be in target mode by default. Only if required by the application, the device may switch to initiator mode. Because of this, the user has to be aware of low-level device type issues for different applications. The current specification does not generally allow for instant "always-on" feeling for NFC devices, only reader/card type of applications and dedicated devices can be implemented in a way that the user doesn't need to know which device has to be switched on first.

Depending on the device type, with the current state of the art, the user has to be aware of the application he wants to perform, the different device types, e.g. initiator and target devices.

Solution

As shown in FIG. 1, this invention e.g. uses a timing scheme to be able to establish a NFC connection instantly, but also to avoid any collisions on the air interface. To avoid the situation that both devices are emitting an RF field in the same time interval, the listening period $T_{Listen}$ shall contain a random delay:

$$T_{Listen} = T_{Listen,Fix} + T_{Listen,Random}$$

$T_{Listen}$ is the time interval in which the NFC device is trying to receive the RF field from another NFC device. If communication starts during $T_{Listen}$, the device will become the NFC Target.

$T_{Poll}$ is the time interval in which the NFC device is actively sending out a RF field in order to find any passive NFC device by providing energy. If communication starts during $T_{Poll}$, the device will become the NFC Initiator.

By this method, a device can have an active NFC interface all the time, and even if both devices are getting in range without prior user action, the communication can start instantly.

For optimising the power consumption of the device, it is advisable that the communication process (Listen, Poll, Listen, Poll, etc) is started only when a communication is expected. By this method, the battery powered device can save power (by increasing $T_{Listen}$) and reduce at the same time the probability to get the initiator role. If passive communication is used, the battery powered device can make use of the energy of the mains-powered device by adjusting the timing parameters and reducing the probability to be initiator, i.e. to have the burden of providing the RF field. Example: If a user wants to transmit pictures from a digital camera to a TV by using NFC, the TV would have an active NFC interface all the time, i.e. it would poll, listen, poll etc without any sleep period.

But the camera would be in target mode until the user selects the pictures to transfer. When the pictures are selected, the NFC interface would be powered up (probably still not within reach of the TV) and would also poll, listen, poll etc. searching for a second NFC device to transmit pictures. But the listen period would be longer and the poll period shorter than the periods of the TV, and therefore the probability for the TV to get initiator (and to provide the field energy) is much higher than the probability for the camera.

When the devices are close to each other, one device will start communication based on the timing selections of $T_{Listen}$ and $T_{Poll}$. To save power on battery devices, the timing parameters $T_{Listen}$ and $T_{Poll}$ shall be selected in a way that the probability for the battery powered devices to start communication is lower than the probability for the mains-powered devices.

FIGS. 2 and 3 show that the probability to get the Initiator role is depending on the choice of the selection of the timing intervals $T_{Listen}$ and $T_{Poll}$.

Advantages

By using this method, the NFC devices can have an active NFC interface all the time without disturbing other NFC devices. Also instant data communication without the need of user interaction is possible.

By introducing the timing scheme, battery-powered device can save power and avoid to get the Initiator role, i.e. avoid to be forced to provide the RF energy.

BRIEF DESCRIPTION OF THE DRAWINGS

The invention will now be explained based on preferred embodiments thereof and by taking reference to the accompanying and schematical figures.

DETAILED DESCRIPTION OF THE INVENTION

In the following functional and structural similar or equivalent element structures will be denoted with the same reference symbols. Not in each case of their occurrence a detailed description will be repeated.

Figure 1:
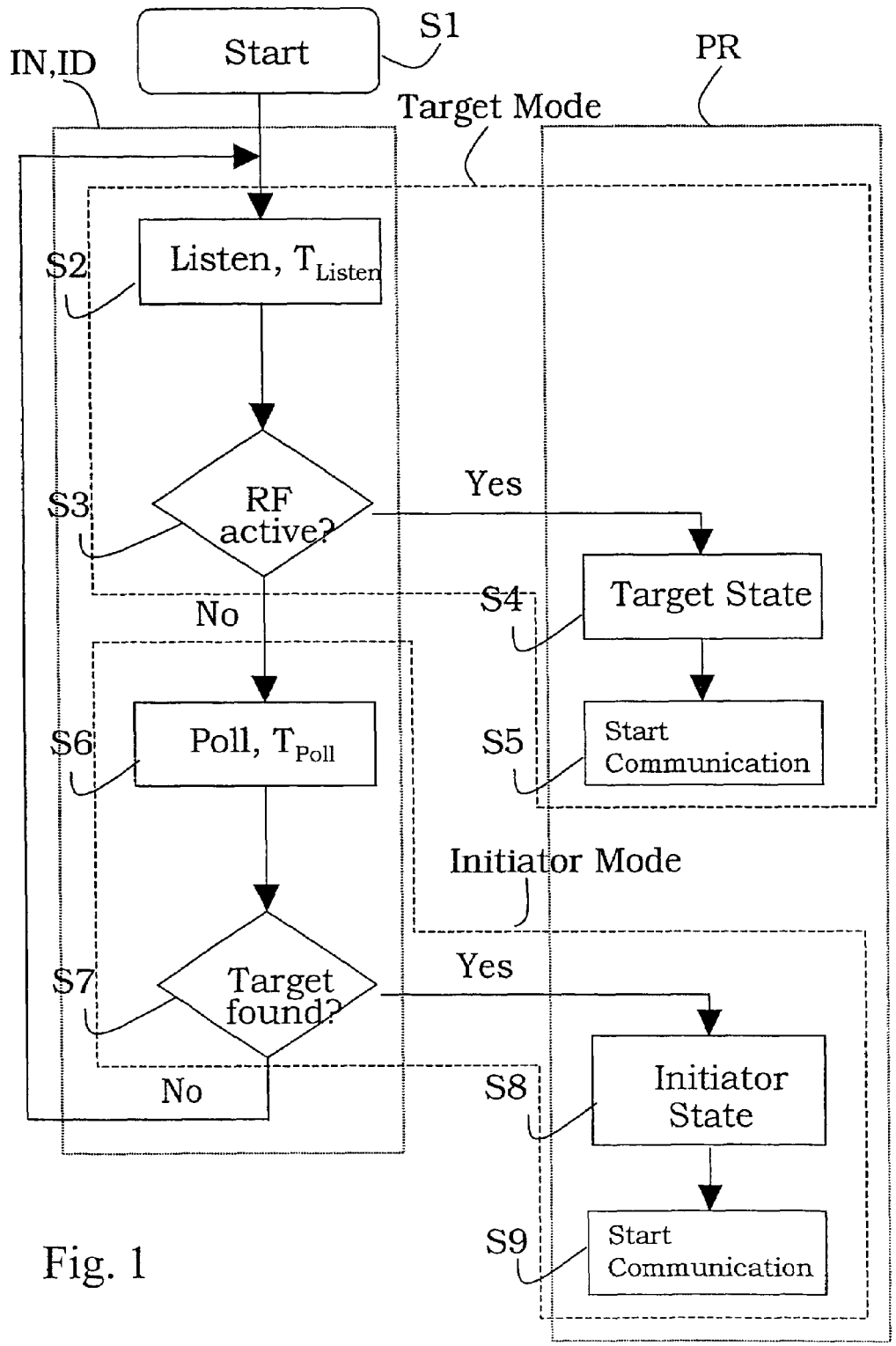
FIG. 1 is a schematical flow chart of a preferred embodiment of the inventive method for operating a near field communication system.
Figure 2:
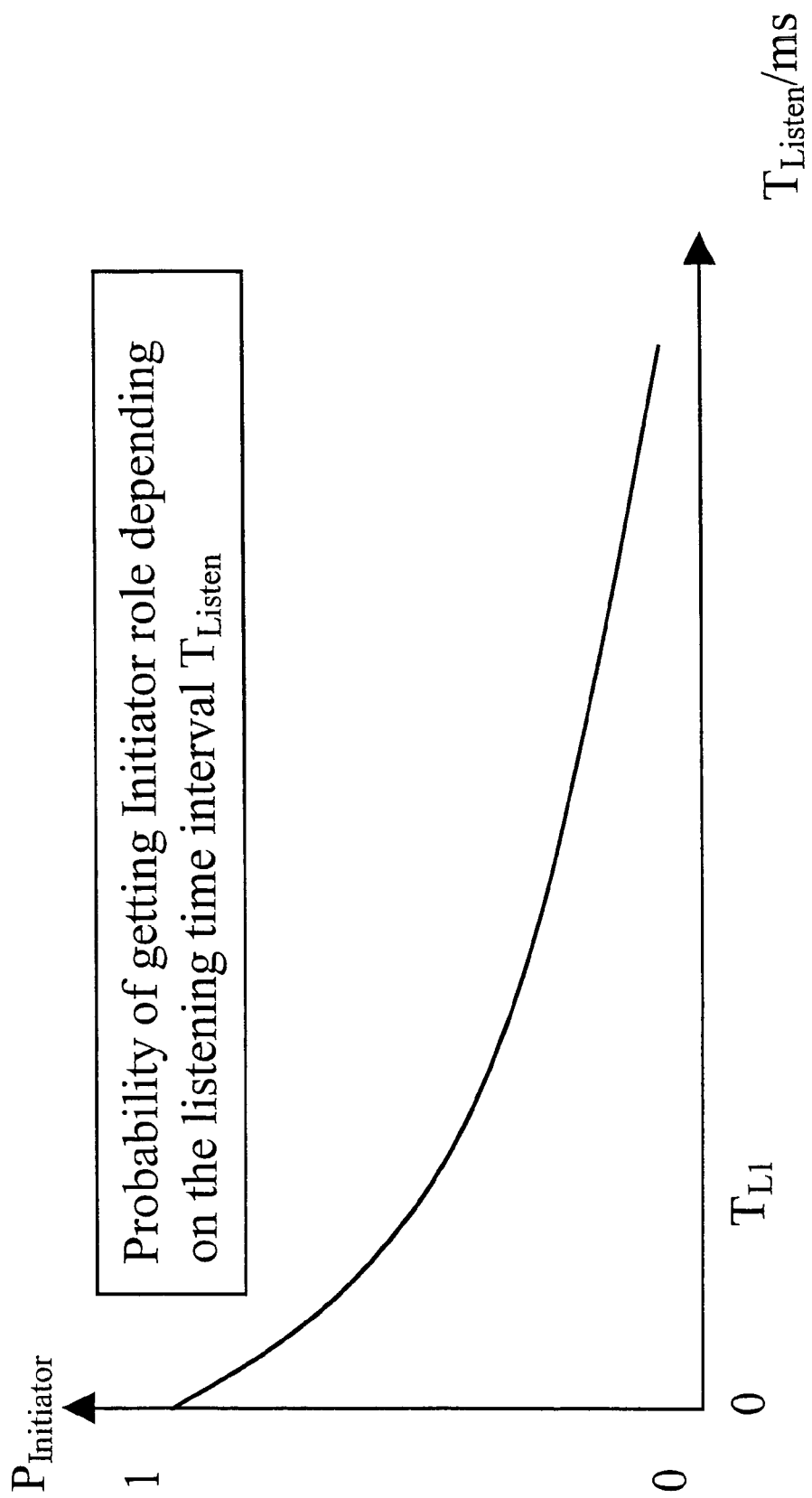
FIGS. 2, 3 show by means of graphical representations the probability relationships.
Figure 3:
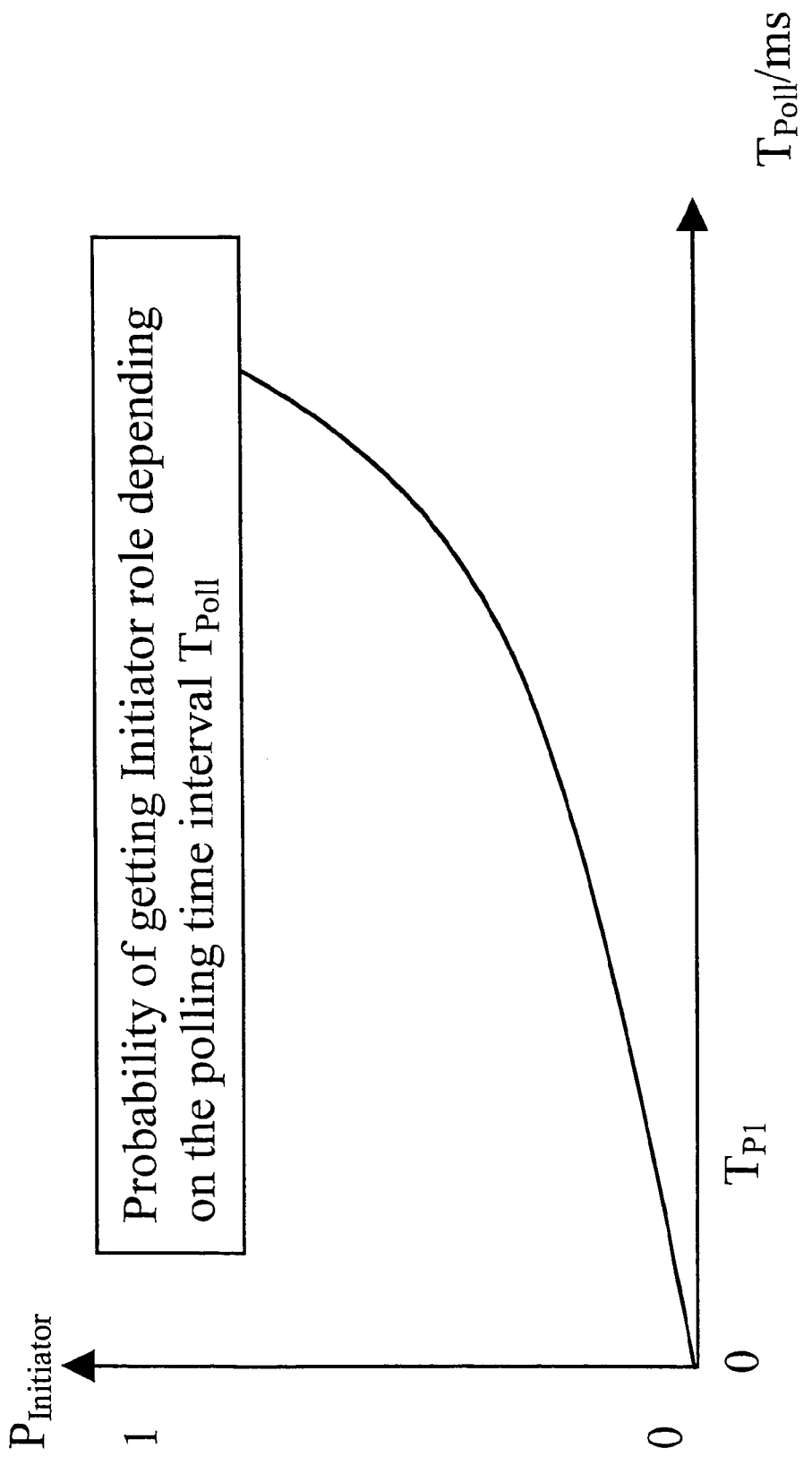

FIG. 1 is a schematical flow chart of a preferred embodiment of the inventive method for operating a near field communication system 10. It is majorly built up by an initialization section IN and a processing section.

The initialization section IN serves to prepare for, enable and establish a near field communication an comprises an idle process ID in which a given near field communication device 21, 22 either searches in the target operational mode or target mode as a potential target device T for a potential initiator device I by listening for a RF signal—according to steps S2 and S3—or as a potential initiator device or initiator I in the initiator operational mode or initiator mode sends out a RF signal in order to search for a potential target device or target T—according to steps S6 and S7.

The processing section PR comprises the near field communication processes S5 and S9 as such.

The target operational state of step S4 is entered by a potential target device T if during the period of time $T_{Listen}$ of searching or listening for a potential initiator's RF signal such a RF signal is received.

The initiator operational state of step S8 is entered by a potential initiator device I if during the period of time $T_{Poll}$ of polling for a potential target's RF signal reception such a RF signal sink is found.

The period of time $T_{Listen}$ of searching or listening for a potential initiator's RF signal is also referred to as the period of time $t_{target}$ for operating a respective participating near field communication device 21, 22 in the idle process ID in the target operational state or mode.

The period of time $T_{Poll}$ of polling for a potential target's RF signal reception is also referred to as the period of time $t_{initiator}$ for operating a respective participating near field communication device 21, 22 in the idle process ID in the initiator operational state or mode.

Figure 4:
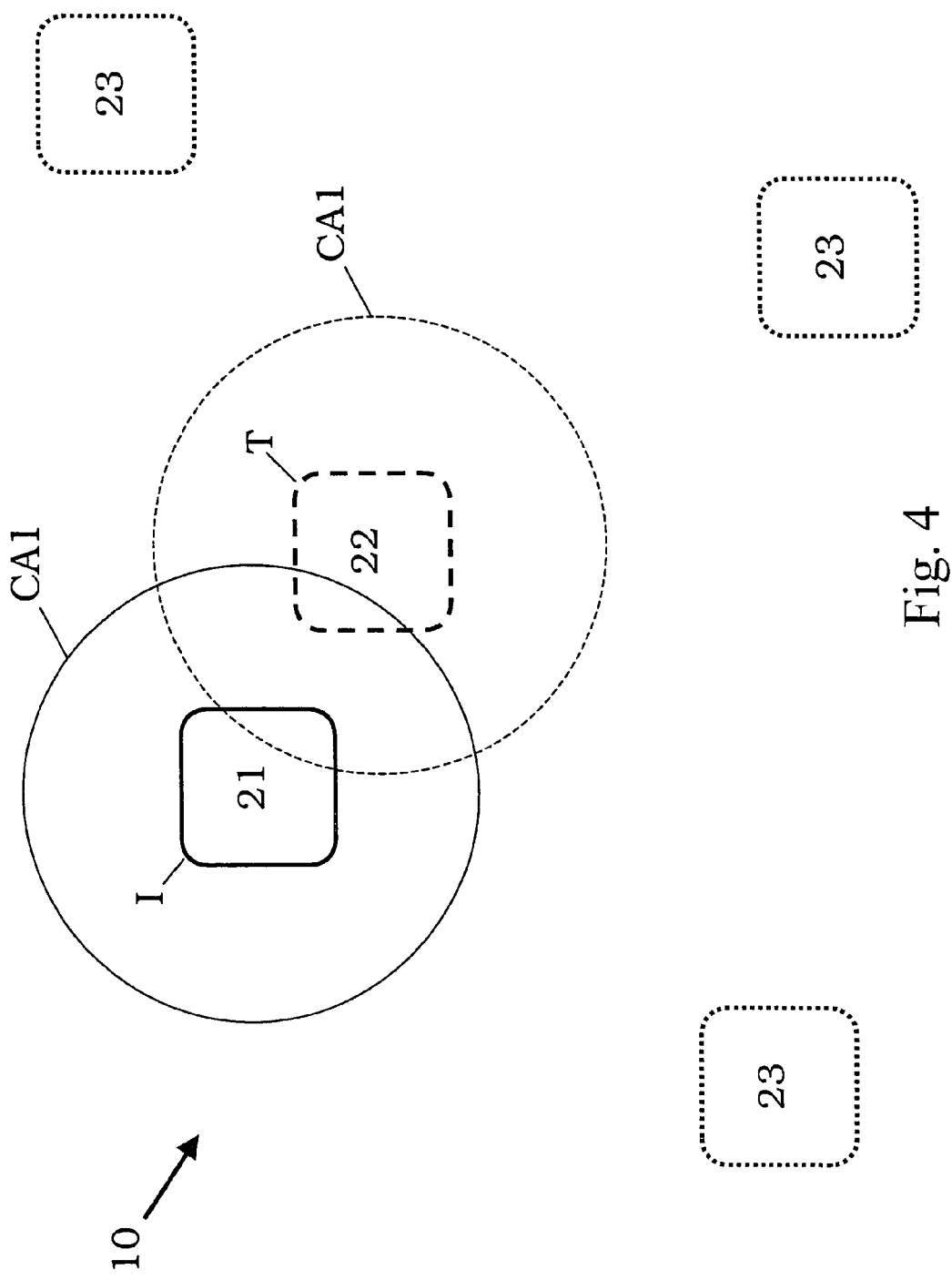
FIG. 4 is a schematical block diagram which demonstrates the typical near field communication situation and a respective near field communication system.

FIG. 4 is a schematical block diagram which demonstrates the typical near field communication situation and a respective near field communication system 10. The near field communication system 10 shown in FIG. 4 comprises a first near field communication device 21 which is assigned to be an initiator device I and a second near field communication device 22 which is assigned to be a target device T. Also further near field communication devices 23 are present. However, according to the short range behaviour of the communication channel, the further devices 23 are situated outside the communication areas CA1 and CA2 of the initiator device I, 21 and the target device T, 22, respectively. Therefore, the further devices 23 are not capable of contributing to the system 10 and to its communication. Only the target device T, 22 and the initiator device I, 21 lie within the communication areas CA1 and CA2, respectively.

REFERENCE SYMBOLS 10 system for near field communication according to the present invention 21 first near field communication device
22 second near field communication device
23 near field communication device
CA1, CA2 communication area
I initialization device
ID idle process
IN initialization section
PR processing section
T target device

The invention claimed is:

1. A method for operating a near field communication system, including a plurality of participating near field communication devices, the method comprising:

setting up a connection between respective participating near field communication devices by repeatedly changing, for each of the plurality of participating near field communication devices, an operational mode of a respective participating near field communication device between a target operational mode in which the respective participating near field communication device listens for a polling signal by other participating near field communication devices and an initiator operational mode in which the respective near field communication device sends out the polling signal to the other participating near field communication devices until communication is established between said respective participating near field communication device and another one of the plurality of participating near field communication devices, or until an interruption condition is fulfilled, wherein the polling signal is the first signal communicated between a near field communication device in the initiator operational mode and a near field communication device in the target optional mode, when setting up the connection.

2. The method according to claim 1, wherein
after setting up said connection between said respective participating near field communication devices, one of the respective participating near field communication devices operates in the initiator operational mode and the other of the respective participating near field communication devices operates in the target operational mode.

3. The method according to claim 1, wherein
the repeatedly changing comprises repeatedly changing, for each of said plurality of participating near field communication devices, the operational mode based on periods of time for operating the respective participating near field communication device in the target operational mode and in the initiator operational mode, respectively, the periods of time being predetermined or generated during operation.

4. The method according to claim 3, wherein
said periods of time for operating the respective participating near field communication device in the target operational mode and in the initiator operational mode are different for different ones of the plurality of participating near field communication devices.

5. The method according to claim 3, wherein
said periods of time for operating the respective participating near field communication device in the target operational mode and in the initiator operational mode are different for a given participating near field communication device.

6. The method according to claim 3, wherein
the time period for operating a given participating near field communication device in said initiator operational mode is shorter than the time period for operating said given participating near field communication device in said target operational mode in order to save energy.

7. The method according to claim 3, wherein
the time period for operating a given participating near field communication device in said initiator operational mode is a randomized value including a fixed component and a random component.

8. The method according to claim 3, wherein
the time period for operating a given participating near field communication device in said target operational mode is a randomized value including a fixed component and a random component.

9. The method according to claim 1, wherein
the repeatedly changing is started with operating the respective participating near field communication device in said initiator operational mode.

10. The method according to claim 1, wherein
the repeatedly changing is started with operating the respective participating near field communication device in said target operational mode.

11. The method according to claim 1, wherein
the repeatedly changing for the respective participating near field communication device is started with a randomly chosen operational mode which is chosen from a group consisting of the initiator operational mode and the target operational mode.

12. A system, comprising means for performing the method for operating a near field communication system according to claim 1.

13. A near field communication device, comprising
means for performing the method for operating a near field communication system according to claim 1.

* * * * *